(12) United States Patent
Pinski et al.

(10) Patent No.: US 11,093,915 B2
(45) Date of Patent: *Aug. 17, 2021

(54) SYSTEM AND METHOD FOR PROVIDING THIRD PARTY PAYMENTS WITH NON-INTEGRATED MERCHANTS

(71) Applicant: Capital One Services, LLC, McLean, VA (US)

(72) Inventors: David Aaron Pinski, Narberth, PA (US); Andrey L. Utis, Media, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,545

(22) Filed: Nov. 25, 2019

(65) Prior Publication Data

US 2020/0090149 A1 Mar. 19, 2020

Related U.S. Application Data

(63) Continuation of application No. 16/138,494, filed on Sep. 21, 2018, now Pat. No. 10,489,761, which is a continuation of application No. 14/206,305, filed on Mar. 12, 2014, now Pat. No. 10,121,130.

(60) Provisional application No. 61/778,776, filed on Mar. 13, 2013.

(51) Int. Cl.
*G06Q 20/00* (2012.01)
*G06Q 20/12* (2012.01)
*G06Q 30/06* (2012.01)

(52) U.S. Cl.
CPC ......... *G06Q 20/12* (2013.01); *G06Q 30/0613* (2013.01)

(58) Field of Classification Search
CPC .......................... G06Q 20/12; G06Q 30/0631
USPC ....................................... 705/26.41
See application file for complete search history.

(56) References Cited

U.S. PATENT DOCUMENTS

| | | | |
|---|---|---|---|
| 7,702,583 B1 | 4/2010 | Hamilton et al. | |
| 8,538,827 B1 | 9/2013 | Dryer et al. | |
| 2001/0054003 A1* | 12/2001 | Chien | G06Q 20/10 705/14.17 |
| 2002/0062249 A1* | 5/2002 | Iannacci | G06Q 20/105 705/14.1 |
| 2003/0163692 A1 | 8/2003 | Kleinsteiber et al. | |

(Continued)

OTHER PUBLICATIONS

Perez, Sarah. "Citi and Best Buy Launch Mobile Rewards App." Aug. 18, 2011. Retrieved from: https://techcrunch.com/2011/08/18/citi-and-best-buy-launch-mobile-rewards-app/ (Year: 2011).*

(Continued)

*Primary Examiner* — Abby J Flynn
(74) *Attorney, Agent, or Firm* — Troutman Pepper Hamilton Sanders LLP; Christopher J. Forstner; John A. Morrissett

(57) ABSTRACT

A system and method in accordance with example embodiments may include third party payments with non-integrated merchants. A system and method in accordance with example embodiments may utilize a plug in or application to intercept retailer data from a third party, analyze data, and present information to a customer based on the intercepted data and the analysis.

20 Claims, 9 Drawing Sheets

(56) References Cited

U.S. PATENT DOCUMENTS

| | | | |
|---|---|---|---|
| 2003/0195840 A1* | 10/2003 | Xu | G06Q 20/4016 |
| | | | 705/38 |
| 2006/0265326 A1 | 11/2006 | Barrett | |
| 2009/0248555 A1 | 10/2009 | Sada et al. | |
| 2010/0257040 A1* | 10/2010 | Hunt | G06Q 30/0215 |
| | | | 705/14.17 |
| 2011/0218884 A1 | 9/2011 | Kothari et al. | |
| 2012/0101882 A1 | 4/2012 | Todd | |
| 2012/0130853 A1* | 5/2012 | Petri | G06Q 30/0609 |
| | | | 705/26.35 |
| 2012/0226546 A1* | 9/2012 | Chuang | G06Q 20/12 |
| | | | 705/14.33 |
| 2013/0110656 A1 | 5/2013 | Chau et al. | |
| 2013/0148891 A1* | 6/2013 | Yassin | G06Q 30/00 |
| | | | 382/190 |
| 2013/0159078 A1* | 6/2013 | Peck | G06Q 40/02 |
| | | | 705/14.17 |
| 2013/0339234 A1 | 12/2013 | Prakash et al. | |

OTHER PUBLICATIONS

Perez, Sarah. "Wallaby's iPhone App Tells You Which Credit Card To Use To Maximize Your Rewards." Nov. 16, 2012. Retrieved from: https://techcrunch.com/2012/11/16/wallabys-iphone-app-tells-you-which-credit-card-to-use-to-maximize-your-rewards/ (Year: 2012).*

Burstein, F. et al., (2008), "Support for real-time decision making in mobile financial applications." Information Systems and eBusiness Management, 6(3), 257-278. doi:http://dx.doi.org/10.1007/s10257-008-0090-4 (Year: 2008).

* cited by examiner

SYSTEM AND METHOD FOR PROVIDING THIRD PARTY PAYMENTS WITH NON-INTEGRATED MERCHANTS

CROSS-REFERENCE TO RELATED APPLICATIONS

This application is a continuation of, and claims priority under 35 U.S.C. § 120 to, U.S. patent application Ser. No. 16/138,494, filed Sep. 21, 2018, which is a continuation of U.S. patent application Ser. No. 14/206,305, now U.S. Pat. No. 10,121,130, filed Mar. 12, 2014, which claims priority to U.S. Provisional Patent Application No. 61/778,776, filed on Mar. 13, 2013, the entire contents of all of which are incorporated herein in their entireties by reference.

FIELD OF THE DISCLOSURE

The present disclosure relates to systems and methods for providing third party payments with non-integrated merchants.

BACKGROUND OF THE DISCLOSURE

When a consumer is using a commercial website to make a purchase, typically, the consumer only has the payment options presented by the merchant. These payment options may include, for example, Visa, MasterCard, American Express, PayPal or other options presented by the merchant. Points (also known as Rewards, or other card-based non-monetary currencies), which are managed by card-issuing banks, represent a non-monetary currency that can be redeemed for goods or services, typically, merchandise or travel. Today this redemption takes place on a financial institution's website, or at merchants that have integrated into the financial institution's systems to access a consumer's points account. Additionally, today a consumer can only use a payment option that they have available at the moment of the transaction, or one that the merchant offers them.

These and other drawbacks exist.

SUMMARY OF THE DISCLOSURE

A system for providing third party payments with non-integrated merchants includes a processor that intercepts retailer data from a third party website, an analysis processor that analyzes the intercepted data in relation to data pertaining to a customer, and an presentation processor that displays a payment option to a user on a user interface of a device associated with the user based on the intercepted retailer data.

A method for providing third party payments with non-integrated merchants includes intercepting, using a processor configured to execute a browser plugin, retailer data from a third party website, analyzing, using an analysis processor, the intercepted data in relation to data pertaining to a customer, and displaying, using a presentation processor, a payment option to a user on a user interface of a device associated with the user based on the intercepted retailer data.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

Figure 1:
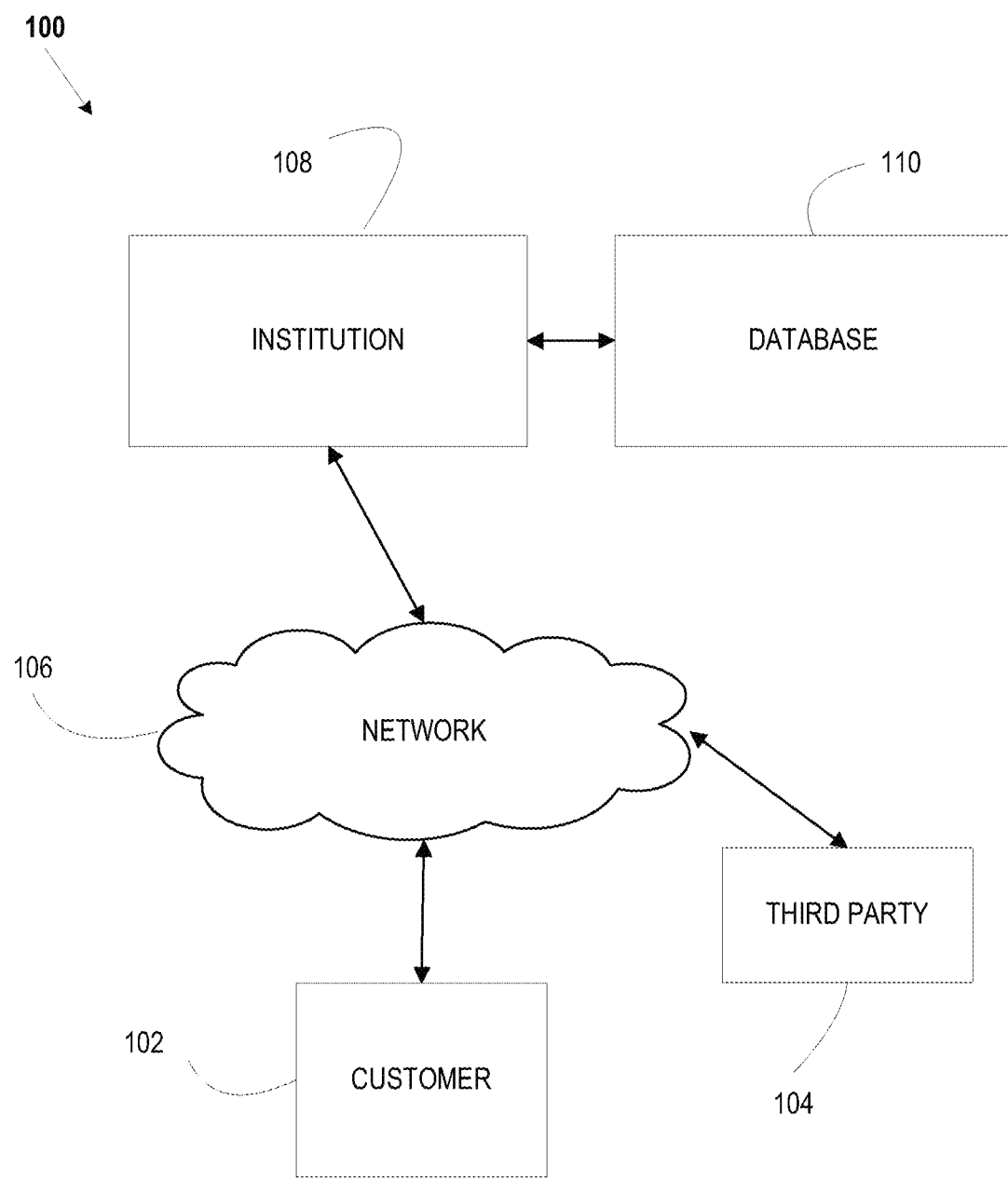
FIG. 1 depicts an example embodiment of a system implementing third party payments with non-integrated merchants.

The following description is intended to convey a thorough understanding of the embodiments described by providing a number of specific example embodiments and details involving systems and methods for providing third party payments with non-integrated merchants. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in various embodiments, depending on specific design and other needs. A financial institution, system supporting a financial institution, and an issuer are used as examples for the disclosure. The disclosure is not intended to be limited to financial institutions or issuers only.

The systems and methods may enable an issuing bank (one that issues credit cards such as Visa or MasterCard) to provide real-time account information and offer alternative payment options during checkout activity from a merchant's website. The systems and methods may operate in the form of a plugin. These are small applications or widgets that enable small applications to run inside of a web browser. The systems and methods may operate as a browser plugin or similar technology that is able to interact with browser data. Additionally, the systems and methods may operate as a mobile app or standalone computer program or service. Further, the functionalities provided by the systems and methods may be provided as part of a larger software package or operating system, and the term "plugin" as used throughout may be implemented in any of those forms or any other potential form.

In an example embodiment, the plugin may be manifested as a browser toolbar, alert, page rendering, popup, etc. As a consumer navigates a website, the issuing bank may identify and intercept pricing data and shopping cart checkout data from the website. As pricing data is displayed, the issuing bank may evaluate the data in real time and determine if an offer is to be made. The offer may appear as a toolbar indicator, modification to the rendering of the webpage, or with a popup. As an example and not by way of limitation, the color of the displayed item pricing may be altered to green or red, to indicate if the user has enough of a credit line to purchase the item, or if points are available as at redemption. Alternatively, a popup may appear to notify the customer that they have the necessary credit line to purchase.

In a fully manifested solution, as a consumer goes through the checkout process, an offer of credit or purchase with points may be made. This offer may be through a popup or through altering the rendered page. If the customer accepts the offer to purchase with a special line of credit or to pay with points, the transaction may continue normally using the consumer's existing debit or credit card from the issuer. When the consumer accepts the offer from the issuer, the value of the transaction, and the event time may be transmitted to the issuer. The merchant's website may receive authentication for the transaction against the consumer's card through its usual clearing process.

When a consumer "accepts" an offer from the issuer, necessary adjustments may be made to the card's credit line. For example if the card has a $5,000 limit, and the current balance is $4900, the user may make a $300 purchase using points. The issuer may temporarily increase the available credit, or cash available (debit cards) on the account. The transaction may proceed as usual through the merchants' shopping cart.

The issuer may match the transaction value and timestamp against the consumer's account once the transaction concludes. They may then shift the charge from the account used for the transaction to another expense account offered to and agreed to by the consumer. This may be a points account, or a one-time line of credit.

This integrated process of making an offer to the consumer is novel to this systems and methods. As the browser widget that supports this systems and methods is executing, it can monitor potential purchase to determine if the consumer is eligible for an alternate means of payment. These alternate payment options may include points or a one time line of credit. A rules engine may evaluate the consumer's credit profile, and rewards accounts when making these determinations. For example, a large purchase of $2000 may be identified as eligible for a one-time line of credit, rather than the consumer opting to revolve the charge on a regular card account. Determining factors may include prior charging behavior, current credit-worthiness, the issuer's desire to make loans, the riskiness of the transaction, the item being purchases, the retailer (or merchant or online e-commerce website) selling the item, or other factors. For example, if the consumer is purchasing a vacation for $2,000, or a major appliance for $2,000, there may be a different offer or rate or credit options from the issuer. For a small purchase of $50, there may be an offer to use points. As there is a high abandonment rate of online shopping carts, the issuer may use this offer of alternate payments to encourage the consumer to complete the transaction. The transaction also may be consummated using the consumer's existing card and processed through the merchant's existing payment system. The merchant and their systems do not need to be a party to the alternate payments at settlement.

The browser widget may be linked to a consumer account through a secure channel. This may include using a read-only API (Application Programming Interface) or direct service to the issuing bank. This link may optionally not permit any transactions other than those associated with shopping behavior. By design, the link may optionally not be a substitute for a bank's fully functional website. This browser widget may gather necessary data regarding the shopping items and carts and transmit them to the card issuing bank for evaluation. If the data is matched for an offer, the details may be transmitted back to the widget for presentment and decisioning by the consumer.

FIG. 1 depicts an example system 100 for use with providing third-party payments with non-integrated merchants. System 100 may include a customers 102, one or more of a third party 104, a network 106, an institution 108, and a database 110.

One or more customers 102 may be in communication with the system 100. The one or more customers 102 may be, for example and not by way of limitation, an individual or business with a credit card or banking account with a bank or other financial institution. A customer 102 may use the credit card or banking account to consummate a number of transactions with others. For example and not by way of limitation, a customer may utilize a credit card, debit card or mobile payment device to purchase an item at a retailer.

A customer 102 may wish to consummate a transaction with a third party 104. The third party 104 may be, for example and not by way of limitation, a purveyor of goods and services. The third party 104 may be a brick and mortar retail location, an individual performing services, an online retailer, a financial institution, or any other party. The third party 104 may host an online retail store, e-commerce website, or other site or application offering goods or services for sale to a buyer. For example and not by way of limitation, the third party 104 may wish to receive payment or otherwise consummate a transaction with a customer 102.

Network 106 may enable communication between an institution 108 and one or more customers 102. For example, Network 106 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 106 may include, without limitation, telephone lines, fiber optics, IEEE Ethernet 902.3, a wide area network ("WAN"), a local area network ("LAN"), or a global network such as the Internet. Also network 106 may support an Internet network, a wireless communication network, a cellular network, or the like, or any combination thereof. Network 106 may further include one network, or any number of the example types of networks mentioned above, operating as a stand-alone network or in cooperation with each other. Network 106 may utilize one or more protocols of one or more network elements to which they are communicatively coupled. Network 106 may translate to or from other protocols to one or more protocols of network devices. Although network 106 is depicted as a single network, it should be appreciated that according to one or more embodiments, network 106 may comprise a plurality of interconnected networks, such as, for example, the Internet, a service provider's network, a cable television network, corporate networks, and home networks.

Institution 108 may provide accounts for one or more customers 102. In an example embodiment, the institution 108 may retrieve e-receipts from the electronic mail account of a customer 102 and extract data from the e-receipts. The institution 108 may store the extracted data in a customer information database 110, and may optionally associate the data with other portions of information, such as a line item on a statement for presentation to the customer 102. Data may be stored in a format such as, for example, a flat file, an indexed file, a hierarchical database, a post-relational database, a relational database, such as a database created and maintained with software from, for example Oracle® Corporation, Microsoft® Excel file, Microsoft® Access file, or any other storage mechanism.

Figure 9:
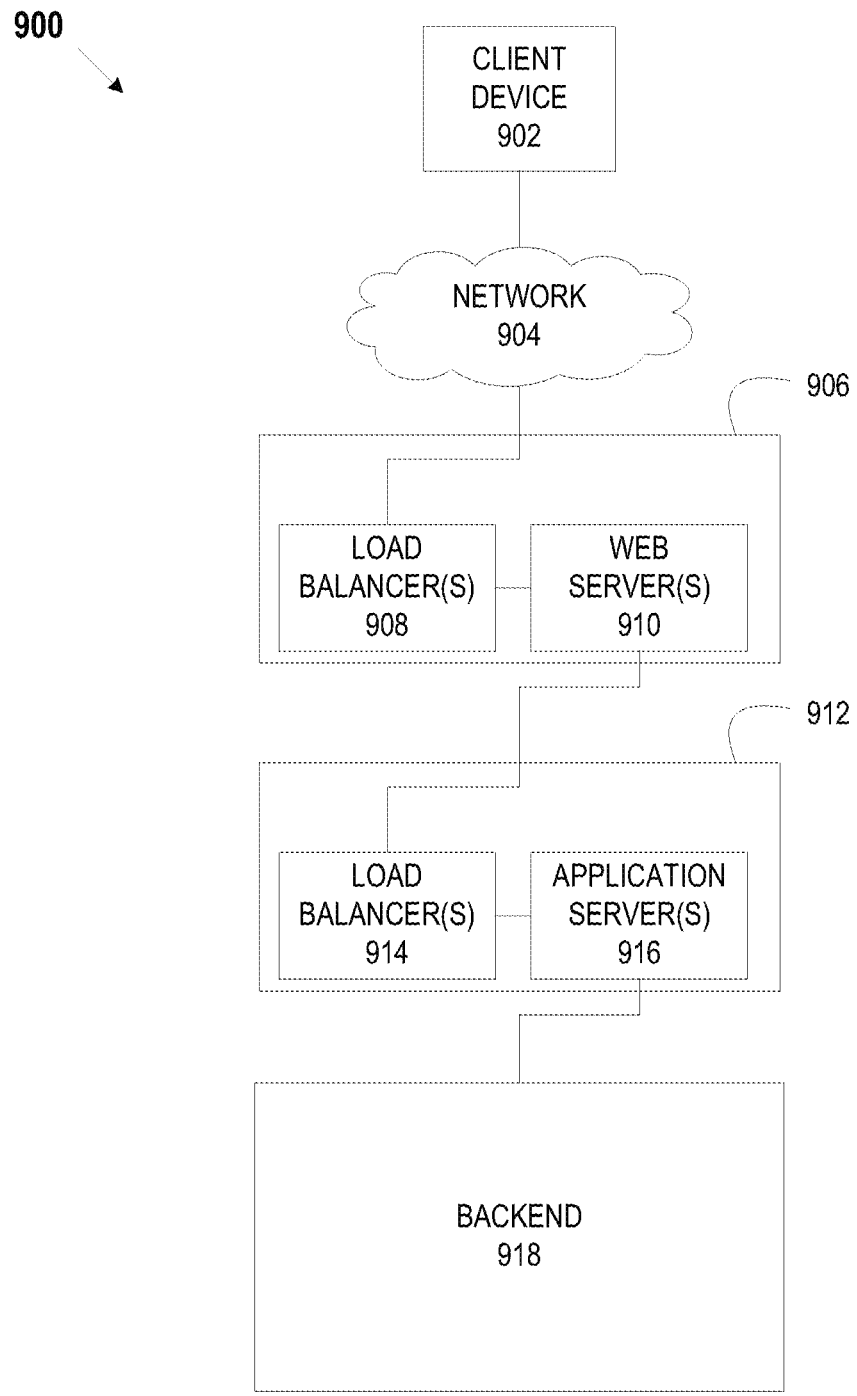
FIG. 9 depicts an example embodiment of a system implementing third party payments with non-integrated merchants.

FIG. 9 depicts an example system 900 that may enable a financial institution, for example, to provide network services to its customers. For example, system 900 may enable a financial institution to provide third-party payments with non-integrated merchants. As shown in FIG. 9, system 900 may include a client device 902, a network 904, a front-end controlled domain 906, a back-end controlled domain 912, and a backend 918. Front-end controlled domain 906 may include one or more load balancers 908 and one or more web servers 910. Back-end controlled domain 912 may include one or more load balancers 914 and one or more application servers 916.

Client device 902 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 900 may execute one or more software applications to enable, for example, network communications.

Client device 902 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/ or any other smartphone or like wearable mobile device.

Network 904 may be one or more of a wireless network, a wired network, or any combination of a wireless network and a wired network. For example, network 904 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 904 may include, without limitation, telephone lines, fiber optics, IEEE Ethernet 902.3, a wide area network (WAN), a local area network (LAN) or a global network such as the Internet. Also, network 904 may support an Internet network, a wireless communication network, a cellular network, or the like, or any combination thereof. Network 904 may further include one network, or any number of example types of networks mentioned above, operating as a stand-alone network or in cooperation with each other. Network 904 may utilize one or more protocols of one or more network elements to which they are communicatively couples. Network 904 may translate to or from other protocols to one or more protocols of network devices. Although network 904 is depicted as a single network, it should be appreciated that according to one or more embodiments, network 904 may comprise a plurality of interconnected networks, such as, for example, the Internet, a service provider's network, a cable television network, corporate networks, and home networks.

Front-end controlled domain 906 may be implemented to to provide security for backend 918. Load balancer(s) 908 may distribute workloads across multiple computing resources, such as, for example computers, a computer cluster, network links, central processing units or disk drives. In various embodiments, load balancer(s) 910 may distribute workloads across, for example, web server(S) 916 and/or backend 918 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 908 may include software that monitoring the port where external clients, such as, for example, client device 902, connect to access various services of a financial institution, for example. Load balancer(s) 908 may forward requests to one of the application servers 916 and/or backend 918 servers, which may then reply to load balancer 908. This may allow load balancer(s) 908 to reply to client device 902 without client device 902 ever knowing about the internal separation of functions. It also may prevent client devices from contacting backend servers directly, which may have security benefits by hiding the structure of the internal network and preventing attacks on backend 918 or unrelated services running on other ports, for example.

A variety of scheduling algorithms may be used by load balancer(s) 908 to determine which backend server to send a request to. Simple algorithms may include, for example, random choice or round robin. Load balancers 908 also may account for additional factors, such as a server's reported load, recent response times, up/down status (determined by a monitoring poll of some kind), number of active connections, geographic location, capabilities, or how much traffic it has recently been assigned.

Load balancers 908 may be implemented in hardware and/or software. Load balancer(s) 908 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 910 may include hardware (e.g., one or more computers) and/or software (e.g., one or more applications) that deliver web content that can be accessed by, for example a client device (e.g., client device 902) through a network (e.g., network 904), such as the Internet. In various examples, web servers, may deliver web pages, relating to, for example, online banking applications and the like, to clients (e.g., client device 902). Web server(s) 910 may use, for example, a hypertext transfer protocol (HTTP or sHTTP) to communicate with client device 902. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 910 may respond with the content of that resource or an error message if unable to do so. The resource may be, for example a file on stored on backend 918. Web server(s) 910 also may enable or facilitate receiving content from client device 902 so client device 902 may be able to, for example, submit web forms, including uploading of files.

Web server(s) also may support server-side scripting using, for example, Active Server Pages (ASP), PHP, or other scripting languages. Accordingly, the behavior of web server(s) 910 can be scripted in separate files, while the actual server software remains unchanged.

Load balancers 914 may be similar to load balancers 908 as described above.

Application server(s) 916 may include hardware and/or software that is dedicated to the efficient execution of procedures (e.g., programs, routines, scripts) for supporting its applied applications. Application server(s) 916 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 916 may act as a set of components accessible to, for example, a financial institution or other entity implementing system 900, through an API defined by the platform itself. For Web applications, these components may be performed in, for example, the same running environment as web server(s) 910, and application servers 916 may support the construction of dynamic pages. Application server(s) 916 also may implement services, such as, for example, clustering, fail-over, and load-balancing. In various embodiments, where application server(s) 916 are Java application servers, the web server(s) 916 may behaves like an extended virtual machine for running applications, transparently handling connections to databases associated with backend 918 on one side, and, connections to the Web client (e.g., client device 902) on the other.

Backend 918 may include hardware and/or software that enables the backend services of, for example, a financial institution or other entity that maintains a distributes system similar to system 900. For example, backend 918 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 918 may be associated with various databases, including account databases that maintain, for example, customer account information, product databases that maintain information about products and services available to customers, content databases that store content associated with, for example, a financial institution, and the like. Backend 918 also may be associated with one or more servers that enable the various services provided by system 900. In various example embodiments, backend 918 may include, for example the components that enable providing third-party payments with non-integrated merchants. For example, customer 102 may be associated with a client device 902 and institution 108 may be associated with backend 918. Similarly, customer 102 may be associated with a client device 902 and third party 104 may be associated with backend 918.

Figure 2:
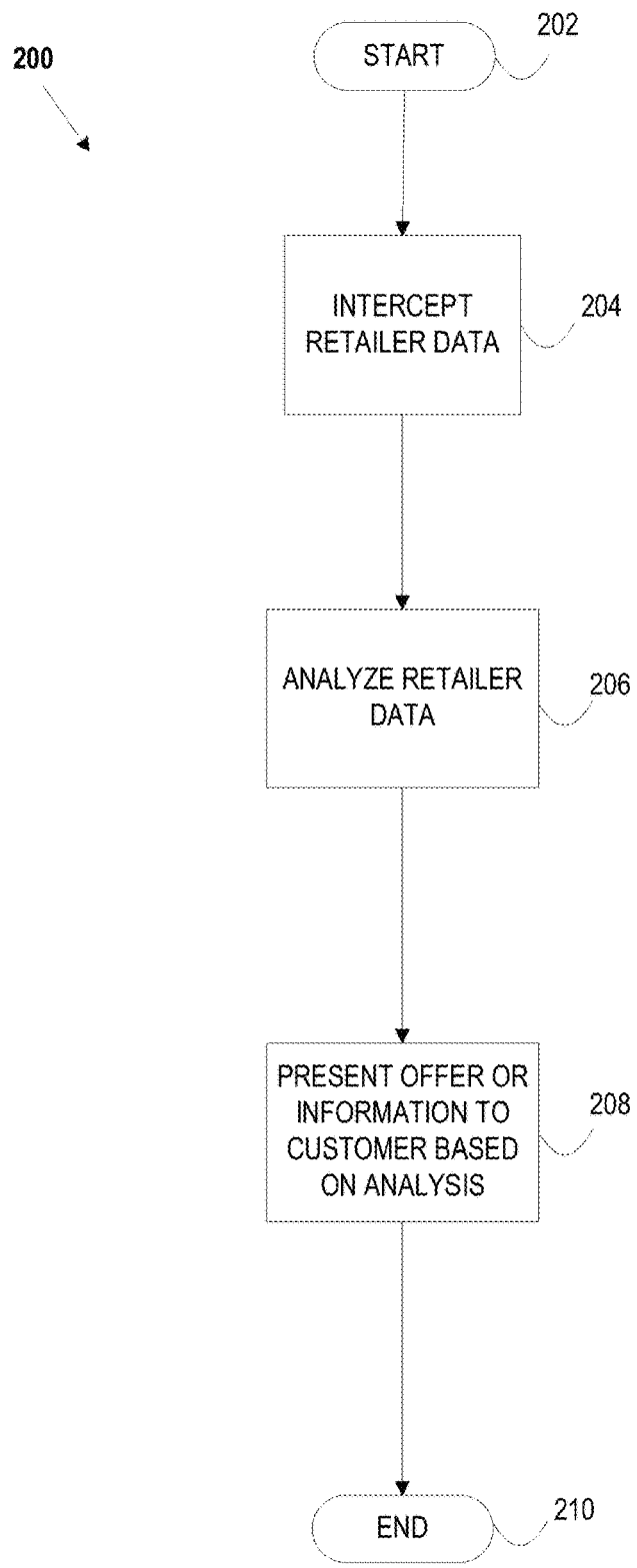
FIG. 2 depicts an example embodiment of a method utilizing third party payments with non-integrated merchants.

FIG. 2 provides an example method 200 for utilizing third party payments with non-integrated merchants. At block 202, the method may start. At block 204, an institution may intercept retailer data. The retailer data may include, for example and not by way of limitation, information regarding the price of an item or service for sale. The retailer data may be intercepted at any stage in a transaction. For example, the retailer data may be intercepted upon presentation of an item list to a consumer. Also, the retailer data may be intercepted upon a user request to purchase an item or service, or in response to any other advantageous event.

At block 206, an institution may analyze the retailer data electronic messages. In an example embodiment, the institution may analyze the retailer data by comparing it with various account details associated with the customer. For example, the institution may analyze the retailer data to determine if the user has enough of a credit line to purchase the item, if points are available as at redemption, or whether the user qualifies for a credit limit increase or an alternate credit line. The institution may analyze the retailer data messages for any other relevant information.

At block 208, the institution may present an offer or information to the customer based on the analysis. In an example embodiment, the institution may offer an alternate line of credit or method of payment. For example, a large purchase of $2000 may be identified as eligible for a one-time line of credit, rather than the consumer opting to revolve the charge on a regular card account. Determining factors may include prior charging behavior, current creditworthiness, the issuer's desire to make loans, the riskiness of the transaction, the item being purchases, the retailer selling the item, or other factors. For example, if the consumer is purchasing a vacation for $2,000, or a major appliance for $2,000, there may be a different offer or rate or credit options from the issuer. For a small purchase of $50, there may be an offer to redeem points. Also, an offer of credit or purchase with points may be made. This may be through a popup or through altering the rendered page. If the customer accepts the offer to purchase with a special line of credit or to pay with points, the transaction may continue normally using the consumer's existing debit or credit card from the issuer. When the consumer accepts the offer from the issuer, the value of the transaction, and the event time may be transmitted to the issuer. Further, the institution may present information relating to how a potential transaction or purchase would affect their account balance, credit limit, or financial standing. At block 214, the method may end.

Figure 3:
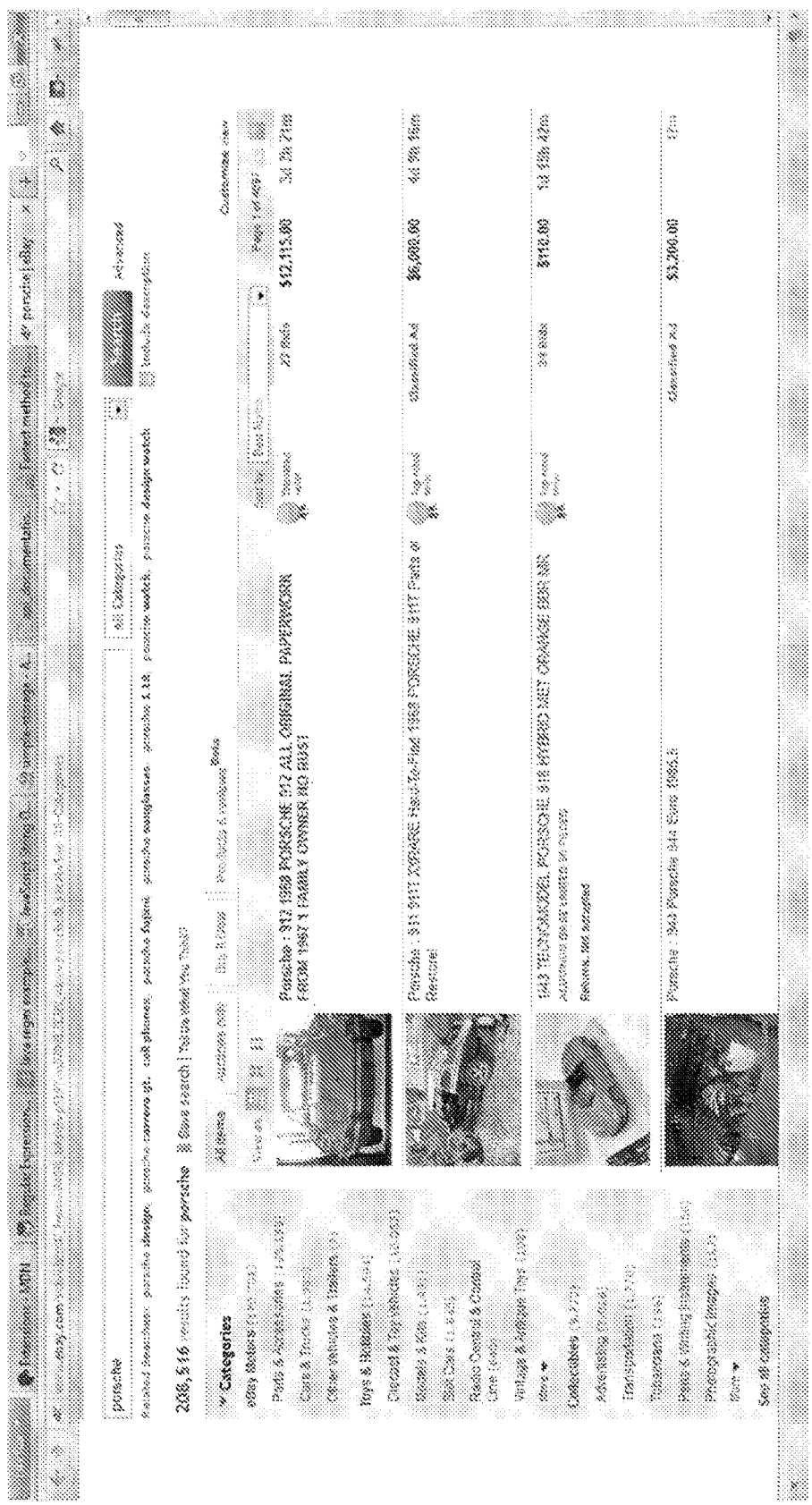
FIG. 3 depicts an example embodiment of a system implementing third party payments with non-integrated merchants.

FIG. 3 shows an example retail website 300 that may operate with a system for providing third party payments with non-integrated merchants. In various examples, a consumer may use a client device, such as a client device similar to client device 902, to access and complete a purchase via website 300.

Figure 4:
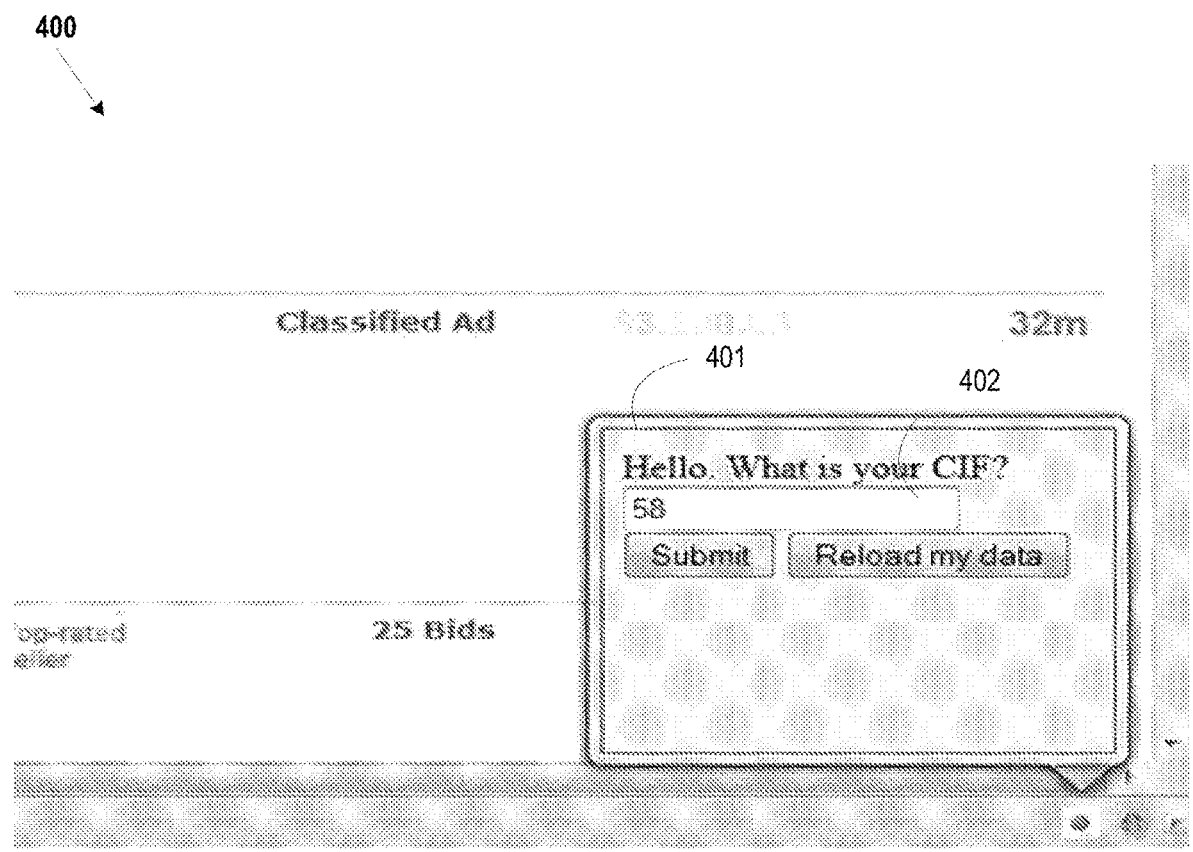
FIG. 4 depicts an example embodiment of a system implementing third party payments with non-integrated merchants.

In FIG. 4, which depicts an expanded view of a website 400, a user may enable a plugin or application 401 and optionally enter an identification code or other information 402.

Figure 5:
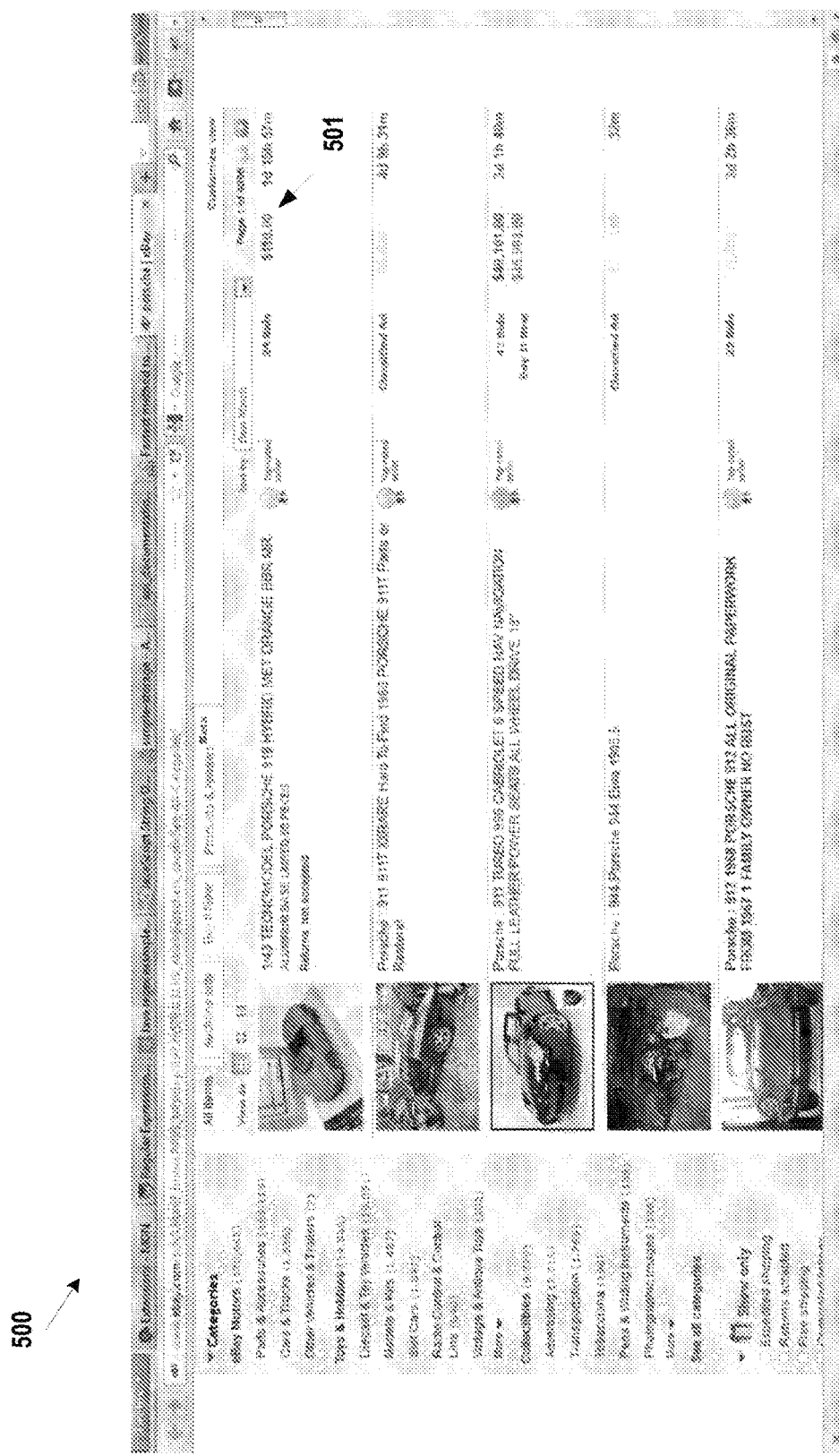
FIG. 5 depicts an example embodiment of a system implementing third party payments with non-integrated merchants.

FIG. 5 shows a website 500 including the presentation of an offer or information 501 to a user. For example and not by way of limitation, the offer or information 501 may include, the color of the displayed item pricing may be altered to green or red, to indicate if the user has enough of a credit line to purchase the item, or if points are available as at redemption.

Figure 6:
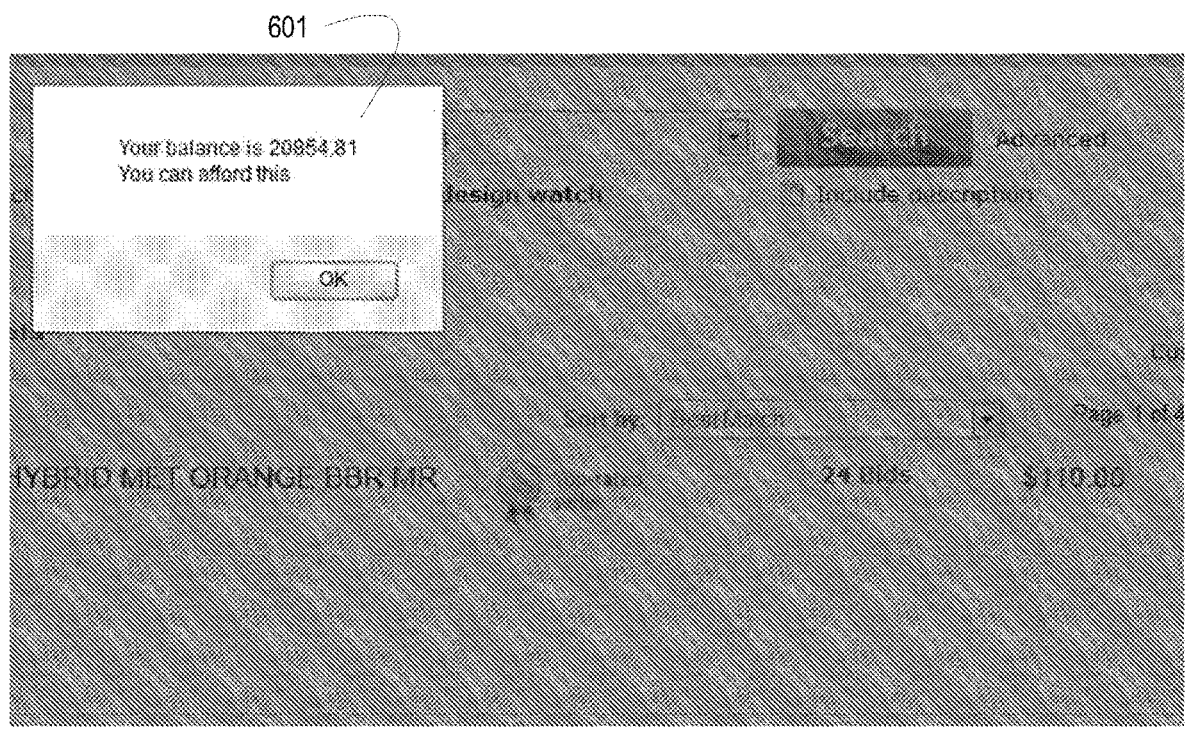
FIG. 6 depicts an example embodiment of a system implementing third party payments with non-integrated merchants.
Figure 7:
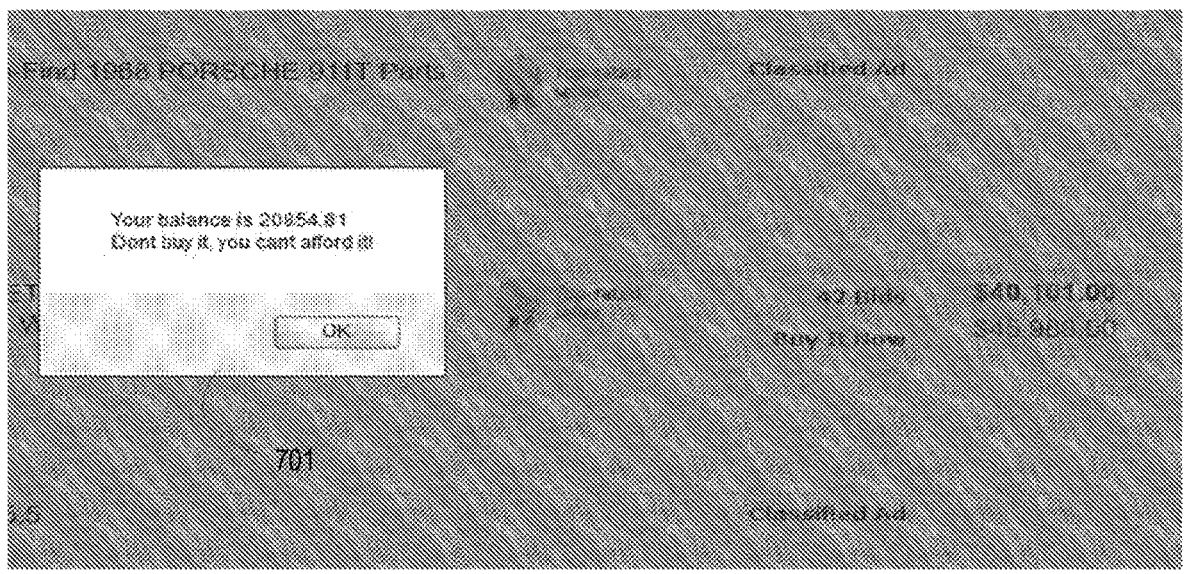
FIG. 7 depicts an example embodiment of a system implementing third party payments with non-integrated merchants.
Figure 8:
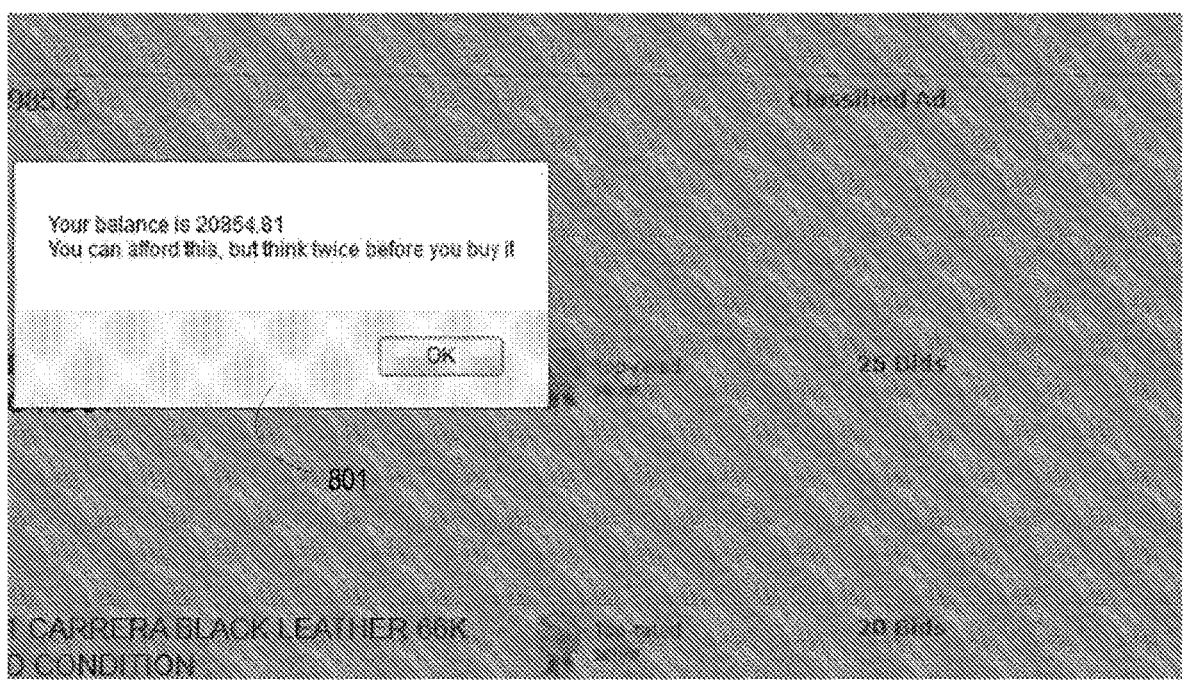
FIG. 8 depicts an example embodiment of a system implementing third party payments with non-integrated merchants.

Also, FIGS. 6, 7, and 8 show presenting offers and/or information to a user. FIG. 6 displays a popup message 601 informing a user of sufficient balance to purchase an item. FIG. 7 displays a popup message 701 informing a user of insufficient balance to purchase an item. FIG. 8 displays a popup message 801 informing a user of a sufficient balance to purchase an item, but warns the user of potential impact on their financial status, for example decline in account balance.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the systems and methods as set forth in the claims that follow. The specification and drawings are accordingly to be regarded as an illustrative rather than restrictive sense.

What is claimed is:

1. A non-transitory, computer readable medium comprising code for a browser widget that, when executed by a processor, cause the processor to:
   monitor interactions between a customer device and a third-party website associated with a merchant system, the customer device being linked to a non-integrated payment account associated with a user of the customer device, the non-integrated payment account comprising one or more non-integrated payment options (i) not offered by the third-party website and (ii) being serviced by an issuer system that is independent from and unassociated with the merchant system;
   responsive to detecting a potential purchase of one or more items or services from the third-party website, determine retailer data from the third-party website, the retailer data comprising a transaction amount associated with the one or more items or services to be purchased from the third-party website;
   determine, based at least in part on the retailer data and account data associated with the non-integrated payment account, that a purchase by the user is eligible for an applicable non-integrated payment option of the one or more non-integrated payment options;
   output instructions for displaying, on a display of the customer device a selectable option associated with paying the transaction amount via the applicable non-integrated payment option; and
   responsive to receiving, from the customer device, an indication of selection of the selectable option, transmit, to the issuer system, customer-inputted transaction data comprising information indicative of a purchasing financial account and the applicable non-integrated payment option, such that the issuer system is enabled to process a payment for purchase of the one or more items or services to be purchased from the third-party website by:
      providing a temporary adjustment to the purchasing financial account to offset an amount of funds equal to the transaction amount;
      transferring, from the purchasing financial account and to the merchant system, the amount of funds equal to the transaction amount; and
      subsequent to transferring the amount of funds to the merchant system:
         shifting payment of the amount of funds from an account associated with the applicable non-integrated payment option to the purchasing financial account; and
         removing the temporary adjustment from the purchasing financial account.

2. The non-transitory, computer readable medium of claim 1, wherein detecting the potential purchase of one or more items or services from the third-party website comprises at least one of:
   selection of an item or service for purchase;
   presentation, by the third-party website, of a shopping cart list indicative of one or more items selected for purchase;
   presentation, by the third-party website, of a payment information interface;
   presentation, by the third-party website, of one or more integrated payment options; and
   receipt of a request to determine whether the purchase by the user is eligible for one of the one or more non-integrated payment options, the request received from the customer device and indicative of a manual request by the user.

3. The non-transitory, computer readable medium of claim 1 further comprising:
   responsive to receiving, from the customer device, the indication of selection of the selectable option, output instructions for displaying, on the display of the customer device, a message indicative of a sufficient balance of funds for payment with the applicable non-integrated payment option and a potential impact on a status associated with the applicable non-integrated payment option.

4. The non-transitory, computer readable medium of claim 1, wherein determining that the purchase by the user is eligible for the applicable non-integrated payment option comprises determining, based on the retailer data and the account data, the applicable non-integrated payment option has a sufficient amount of available credit to purchase the one or more items or services to be purchased from the third-party website.

5. The non-transitory, computer readable medium of claim 1, wherein determining that the purchase by the user is eligible for the applicable non-integrated payment option comprises determining, based on the retailer data and the account data, whether the applicable non-integrated payment option has a sufficient number of rewards points to redeem as payment for the one or more items or services to be purchased from the third-party website.

6. The non-transitory, computer readable medium of claim 1, wherein determining that the purchase by the user is eligible for the applicable non-integrated payment option comprises determining, based on the retailer data and the account data, whether the applicable non-integrated payment option qualifies for a credit limit increase or an alternate credit line to purchase the one or more items or services to be purchased from the third-party website.

7. The non-transitory, computer readable medium of claim 1, wherein determining that the purchase by the user is eligible for the applicable non-integrated payment option comprises:
   identifying at least one item or service of the one or more items or services to be purchased from the third-party website; and
   determining that the at least one item or service is eligible to be purchased via redemption of rewards points associated with the issuer system.

8. The non-transitory, computer readable medium of claim 1, wherein determining that the purchase by the user is eligible for the applicable non-integrated payment option comprises:
   identifying at least one item or service of the one or more items or services to be purchased from the third-party website; and
   determining that the at least one item or service is eligible to be purchased via a one-time line of credit.

9. A method comprising:
   monitoring interactions between a customer device and a third-party website associated with a merchant system, the customer device being linked to a non-integrated payment account associated with a user of the customer device, the non-integrated payment account comprising one or more non-integrated payment options (i) not offered by the third-party website and (ii) being serviced by an issuer system that is independent from and unassociated with the merchant system;
   responsive to detecting a potential purchase of one or more items or services from the third-party website, determining retailer data from the third-party website, the retailer data comprising a transaction amount associated with the one or more items or services to be purchased from the third-party website;
   determining, based at least in part on the retailer data and account data associated with the non-integrated payment account, that a purchase by the user is eligible for an applicable non-integrated payment option of the one or more non-integrated payment options;
   outputting instructions for displaying, on a display of the customer device a selectable option associated with paying the transaction amount via the applicable non-integrated payment option; and
   responsive to receiving, from the customer device, an indication of selection of the selectable option, transmitting, to the issuer system, customer-inputted transaction data comprising information indicative of a purchasing financial account and the applicable non-integrated payment option, such that the issuer system is enabled to process a payment for purchase of the one or more items or services to be purchased from the third-party website by:
      providing a temporary adjustment to the purchasing financial account to offset an amount of funds equal to the transaction amount;
      transferring, from the purchasing financial account and to the merchant system, the amount of funds equal to the transaction amount; and
      subsequent to transferring the amount of funds to the merchant system:
         shifting payment of the amount of funds from an account associated with the applicable non-integrated payment option to the purchasing financial account; and
         removing the temporary adjustment from the purchasing financial account.

10. The method of claim 9, wherein detecting the potential purchase of one or more items or services from the third-party website comprises at least one of:
   selection of an item or service for purchase;
   presentation, by the third-party website, of a shopping cart list indicative of one or more items selected for purchase;
   presentation, by the third-party website, of a payment information interface;
   presentation, by the third-party website, of one or more integrated payment options; and
   receipt of a request to determine whether the purchase by the user is eligible for one of the one or more non-integrated payment options, the request received from the customer device and indicative of a manual request by the user.

11. The method of claim 9 further comprising:
   responsive to receiving, from the customer device, the indication of selection of the selectable option, output instructions for displaying, on the display of the customer device, a message indicative of a sufficient balance of funds for payment with the applicable non-integrated payment option and a potential impact on a status associated with the applicable non-integrated payment option.

12. The method of claim 9, wherein determining that the purchase by the user is eligible for the applicable non-integrated payment option comprises determining, based on the retailer data and the account data, the applicable non-integrated payment option has a sufficient amount of available credit to purchase the one or more items or services to be purchased from the third-party website.

13. The method of claim 9, wherein determining that the purchase by the user is eligible for the applicable non-integrated payment option comprises determining, based on the retailer data and the account data, whether the applicable non-integrated payment option has a sufficient number of rewards points to redeem as payment for the one or more items or services to be purchased from the third-party website.

14. The method of claim 9, wherein determining that the purchase by the user is eligible for the applicable non-integrated payment option comprises determining, based on the retailer data and the account data, whether the applicable non-integrated payment option qualifies for a credit limit increase or an alternate credit line to purchase the one or more items or services to be purchased from the third-party website.

15. The method of claim 9, wherein determining that the purchase by the user is eligible for the applicable non-integrated payment option comprises:
   identifying at least one item or service of the one or more items or services to be purchased from the third-party website; and determining that the at least one item or service is eligible to be purchased via redemption of rewards points associated with the issuer system.

16. The method of claim 9, wherein determining that the purchase by the user is eligible for the applicable non-integrated payment option comprises:

identifying at least one item or service of the one or more items or services to be purchased from the third-party website; and determining that the at least one item or service is eligible to be purchased via a one-time line of credit.

17. A non-transitory, computer-readable medium having instructions stored thereon that, when executed by one or more processors, cause a system to:

receive, from a browser widget linked to a non-integrated payment account associated with a customer device, retailer data comprising a transaction amount associated with one or more items or services to be purchased from a third-party website associated with a merchant system and payment information associated with a purchasing financial account;

determine, based at least in part on the retailer data and account data associated with the non-integrated payment account, that a purchase by a user associated with the non-integrated payment account is eligible for an applicable non-integrated payment option of one or more non-integrated payment options associated with the system, the one or more non-integrated payment options not offered by the third-party website and the system being independent from and unassociated with the merchant system;

output instructions for displaying, on a display of the customer device, a selectable option associated with paying the transaction amount via the applicable non-integrated payment option;

responsive to receiving an indication of selection of the selectable option, output instructions for displaying, on a display of the customer device, a message indicative of a sufficient balance of funds for payment with the applicable non-integrated payment option and a potential impact on a status associated with the applicable non-integrated payment option; and transmit, to the merchant system, payment for purchase of the one or more items or services to be purchased from the third-party web site by:

providing a temporary adjustment to the purchasing financial account to offset an amount of funds equal to the transaction amount; and transferring, from the purchasing financial account and to the merchant system, the amount of funds equal to the transaction amount; and subsequent to transferring the amount of funds to the merchant system:

shifting payment of the amount of funds from an account associated with the applicable non-integrated payment option to the purchasing financial account; and removing the temporary adjustment from the purchasing financial account.

18. The non-transitory, computer-readable medium of claim 17, wherein determining that the purchase by the user is eligible for the applicable non-integrated payment option comprises determining, based on the retailer data and the account data, whether the applicable non-integrated payment option has a sufficient amount of available credit to purchase the one or more items or services to be purchased from the third-party website.

19. The non-transitory, computer-readable medium of claim 17, wherein determining that the purchase by the user is eligible for the applicable non-integrated payment option comprises determining, based on the retailer data and the account data, whether the applicable non-integrated payment option has a sufficient number of rewards points to redeem as payment for the one or more items or services to be purchased from the third-party website.

20. The non-transitory, computer-readable medium of claim 17, wherein determining that the purchase by the user is eligible for the applicable non-integrated payment option comprises determining, based on the retailer data and the account data, whether the applicable non-integrated payment option qualifies for a credit limit increase or an alternate credit line to purchase the one or more items or services to be purchased from the third-party website.

* * * * *